United States Patent
Marukawa et al.

(10) Patent No.: US 10,625,786 B2
(45) Date of Patent: Apr. 21, 2020

(54) VEHICLE BODY SIDE PART STRUCTURE

(71) Applicant: HONDA MOTOR CO., LTD., Tokyo (JP)

(72) Inventors: Taiga Marukawa, Wako (JP); Shohei Ohji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 16/027,578

(22) Filed: Jul. 5, 2018

(65) Prior Publication Data
US 2019/0009825 A1 Jan. 10, 2019

(30) Foreign Application Priority Data
Jul. 5, 2017 (JP) .................................. 2017-131653

(51) Int. Cl.
*B62D 25/02* (2006.01)
*B62D 25/04* (2006.01)
*B60R 13/08* (2006.01)

(52) U.S. Cl.
CPC ........... *B62D 25/025* (2013.01); *B62D 25/04* (2013.01); *B60R 13/0815* (2013.01)

(58) Field of Classification Search
CPC . B60R 13/08; B60R 13/0807; B60R 13/0815; B62D 25/025; B62D 25/04
USPC ................ 296/193.06, 203.03, 209
See application file for complete search history.

(56) References Cited

U.S. PATENT DOCUMENTS

| | | | | |
|---|---|---|---|---|
| 7,140,668 B2 * | 11/2006 | Wesch | ................. | B62D 29/002 296/187.02 |
| 2012/0153680 A1 * | 6/2012 | May | ....................... | B60R 22/24 296/203.03 |
| 2018/0065680 A1 * | 3/2018 | Kamimura | .............. | B60R 22/34 |

FOREIGN PATENT DOCUMENTS

| JP | S62-105877 U | | 7/1987 |
|---|---|---|---|
| JP | 03032990 A | * | 2/1991 |
| JP | H06-32249 A | | 2/1994 |
| JP | 2003-237624 A | | 8/2003 |

OTHER PUBLICATIONS

Japanese Office Action with English translation dated Mar. 19, 2019, 7 pages.
Japanese Office Action with English translation dated Jun. 4, 2019 (7 pages).

* cited by examiner

*Primary Examiner* — Jason S Daniels
(74) *Attorney, Agent, or Firm* — Rankin, Hill & Clark LLP (57) ABSTRACT

A vehicle body side part structure includes a side sill extending in a front-rear direction of a vehicle body, a center pillar outer provided to extend upward from the side sill, a center pillar inner disposed on an inner side in a vehicle width direction of the center pillar outer, and a partition member disposed in a hollow section formed by the center pillar outer and the center pillar inner. In this structure, the center pillar inner has an opening for arrangement of a seatbelt member in the hollow section, and the partition member has a folding part formed into a foldable shape that allows the partition member to pass through the opening.

8 Claims, 6 Drawing Sheets

VEHICLE BODY SIDE PART STRUCTURE

CROSS-REFERENCE TO RELATED APPLICATION

This application is based upon and claims priority from the Japanese Patent Application No. 2017-131653, filed on Jul. 5, 2017, the entire contents of which are incorporated herein by reference.

BACKGROUND OF THE INVENTION

1. Field of the Invention

The present invention relates to a vehicle body side part structure in which a partition body is disposed in a center pillar.

2. Description of the Related Art

In conventional art, a vehicle body structure for improving soundproof property thereof is known in which a foaming base material and a partition member are provided in the closed cross section such as a pillar (see, for example, Patent document 1: Japanese Unexamined Patent Application Publication No.2003-237624 (FIG. 1, FIG. 2)). The partition member disclosed in Patent document 1 is formed by combining together two members of a support member having a flange part and a flat plate-shaped part, and a foaming base material having a plurality of grooves.

In the case where the partition member disclosed in Patent document 1 is provided at a lower part in the center pillar, the lower part of the center pillar joins the center pillar and the side sill together to become complicated, thus posing a problem that the structure is further complicated.

The present invention has therefore been made in view of the above problem, and an object of the present invention is to provide a vehicle body side part structure that has a simple structure and is easy to be assembled.

SUMMARY OF THE INVENTION

In order to solve the above problem, according to an aspect of the present invention, a vehicle body side part structure reflecting one aspect of the present invention includes: a side sill extending in a front-rear direction of a vehicle body; a center pillar outer provided to extend upward from the side sill; a center pillar inner disposed on an inner side in a vehicle width direction of the center pillar outer; and a partition member disposed in a hollow section formed by the center pillar outer and the center pillar inner, wherein the center pillar inner has an opening for arrangement of a seatbelt member in the hollow section, and the partition member has a folding part formed into a foldable shape that allows the partition member to pass through the opening.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE PREFERRED EMBODIMENTS

A vehicle body side part structure according to an embodiment of the present invention will be described in detail with reference to FIGS. 1 to 6.

Note that in the embodiment of the present invention, "front", "rear", "up", "down", and "right-left" indicate a forward movement side of a vehicle, a backward movement side of the vehicle, a vertical upper side, a vertical lower side, and a vehicle width direction side, respectively.

<<Vehicle>>

First, prior to description of a vehicle body side part structure A according to an embodiment of the present invention, description will be given of a vehicle to which the present invention is applied.

Figure 1:
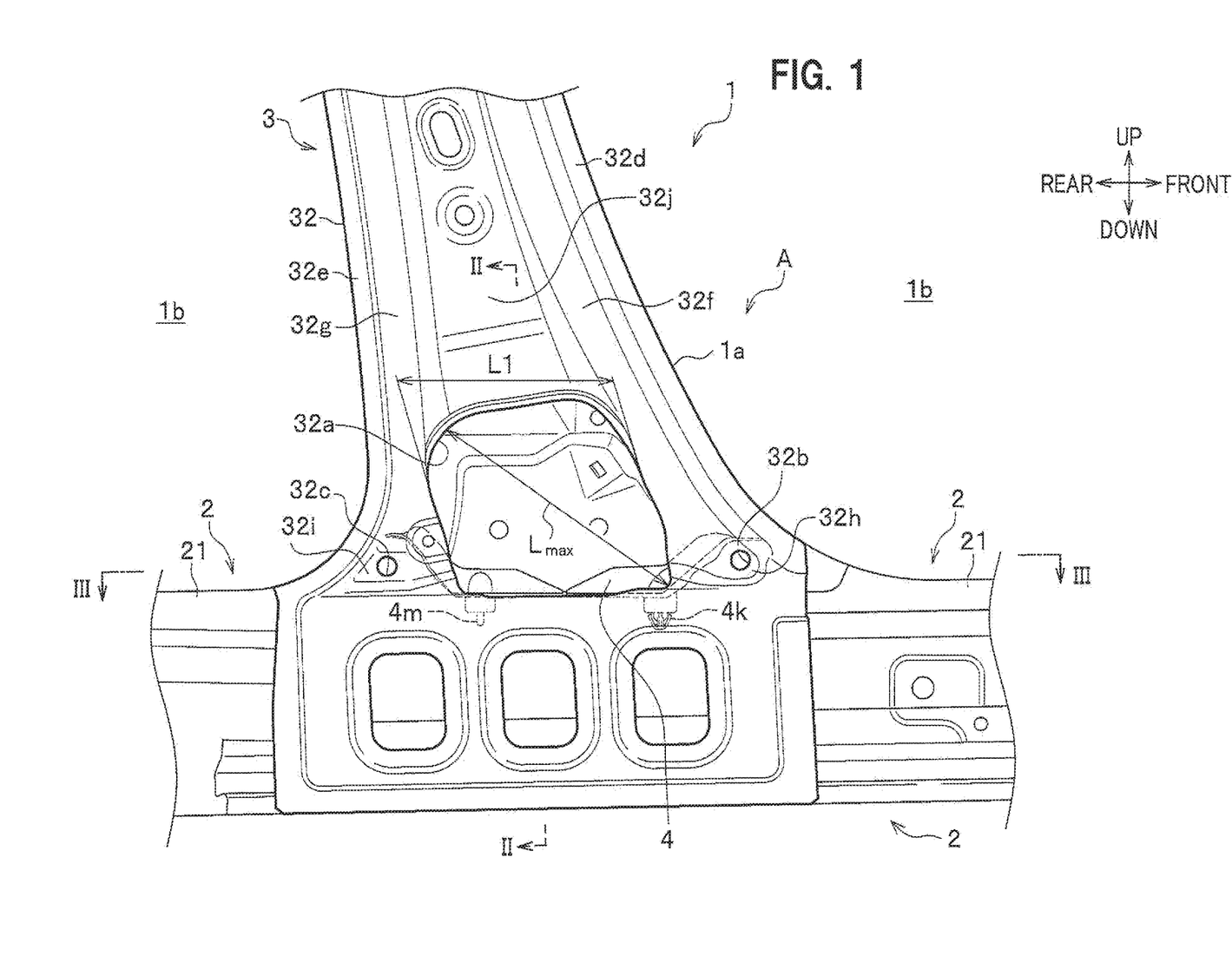
FIG. 1 is an illustration showing a vehicle body side part structure according to an embodiment of the present invention, which is a schematic side view of a main part showing a lower part of a center pillar inner.

As shown in FIG. 1, the vehicle only needs to include at least a center pillar 3, and kinds and forms of the vehicle are not particularly limited. Hereinafter, the vehicle will be described, taking a passenger car provided with the center pillar 3 for example.

Figure 2:
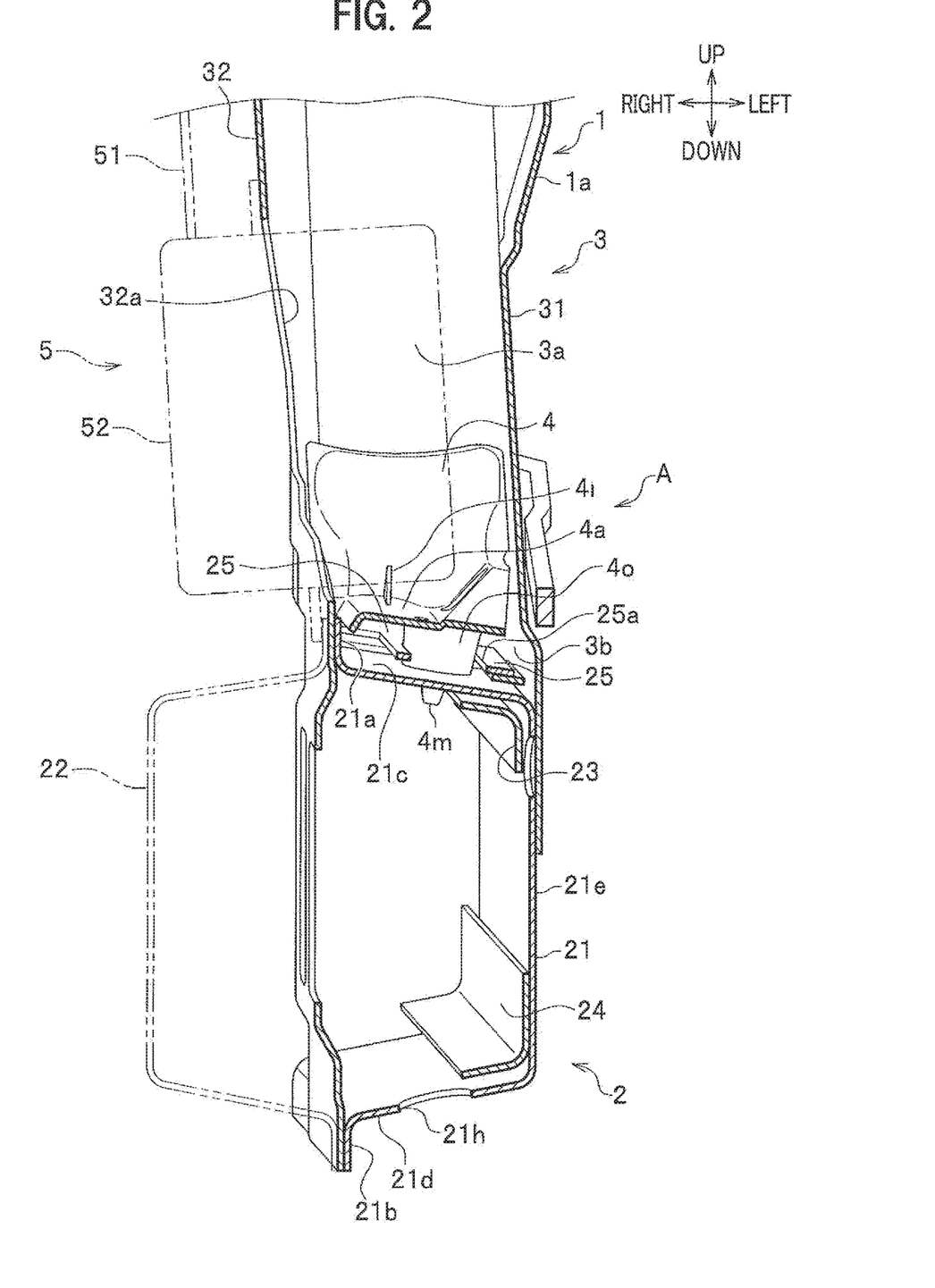
FIG. 2 is an enlarged cross sectional view taken along line II-II in FIG. 1.

As shown in FIG. 2, the vehicle has a seatbelt retractor 52 disposed at a lower part of the center pillar 3, which is adapted to retract a seatbelt 51 of a seatbelt device 5 for restraining an occupant on the seat for protection.

<<Vehicle Body Side Part Structure>>

The vehicle body side part structure A is a structure for forming vehicle body side parts 1*a* on right and left sides of a vehicle body 1. The vehicle body side part structure A is provided with: a side sill 2 provided to extend in the front-rear direction at a lower part of the vehicle body 1; the center pillar 3 provided to extend upward from a central part in the front-rear direction of the side sill 2; a partition member 4 provided inside the center pillar 3; and the seatbelt device 5 disposed on the center pillar 3.

Moreover, door openings 1*b* (see FIG. 1) that are opened and closed by doors (not shown) are formed on front and rear sides of the center pillar 3 located at the center of each of the vehicle body side parts 1*a*.

Note that the vehicle body side parts 1*a* of the vehicle body 1 are formed nearly symmetric laterally, and thus description on the assistant driver's seat side (left side) will be mainly given and description on the driver's seat side (right side) will be omitted.

<<Side Sill>>

As shown in FIG. 2, the side sill 2 is a frame member having a hollow shape that extends in the front-rear direction. The side sill 2 is configured to mainly include a side sill outer 21, a side sill inner 22, reinforcing members 23, 24, and a guide member 25. The center pillar 3 is disposed on the side sill 2 so as to allow a lower end part of the center pillar 3 to be orthogonal to an upper part of the side sill 2 (see FIG. 1). Joined to the side sill 2 is a center pillar inner 32 so as to allow a lower part of the center pillar inner 32 to be interposed between two metal plates of the side sill outer 21 and the side sill inner 22 which are formed in a nearly U-shaped (nearly channel-shaped) cross section in front view, thereby forming two closed cross sections on the right and left sides. Although not illustrated, cross members, floor panels and the like are connected to the inner side in the vehicle width direction of the side sill 2.

<Side Sill Outer>

As shown in FIG. 2, the side sill outer 21 is a member that forms a half body on the outer side in the vehicle width direction of the side sill 2 formed into a nearly tubular shape. The side sill outer 21 and the side sill inner 22 are formed, for example, by pressing a flat plate member made of metal such as high-tensile steel. The side sill outer 21 mainly includes flange parts 21a, 21b formed at upper and lower end parts thereof, an upper face part 21c and a lower face part 21d provided to extend from base ends of the flange parts 21a, 21b toward the outside of the vehicle, and an outer face part 21e formed between the upper face part 21c and the lower face part 21d.

Figure 3:
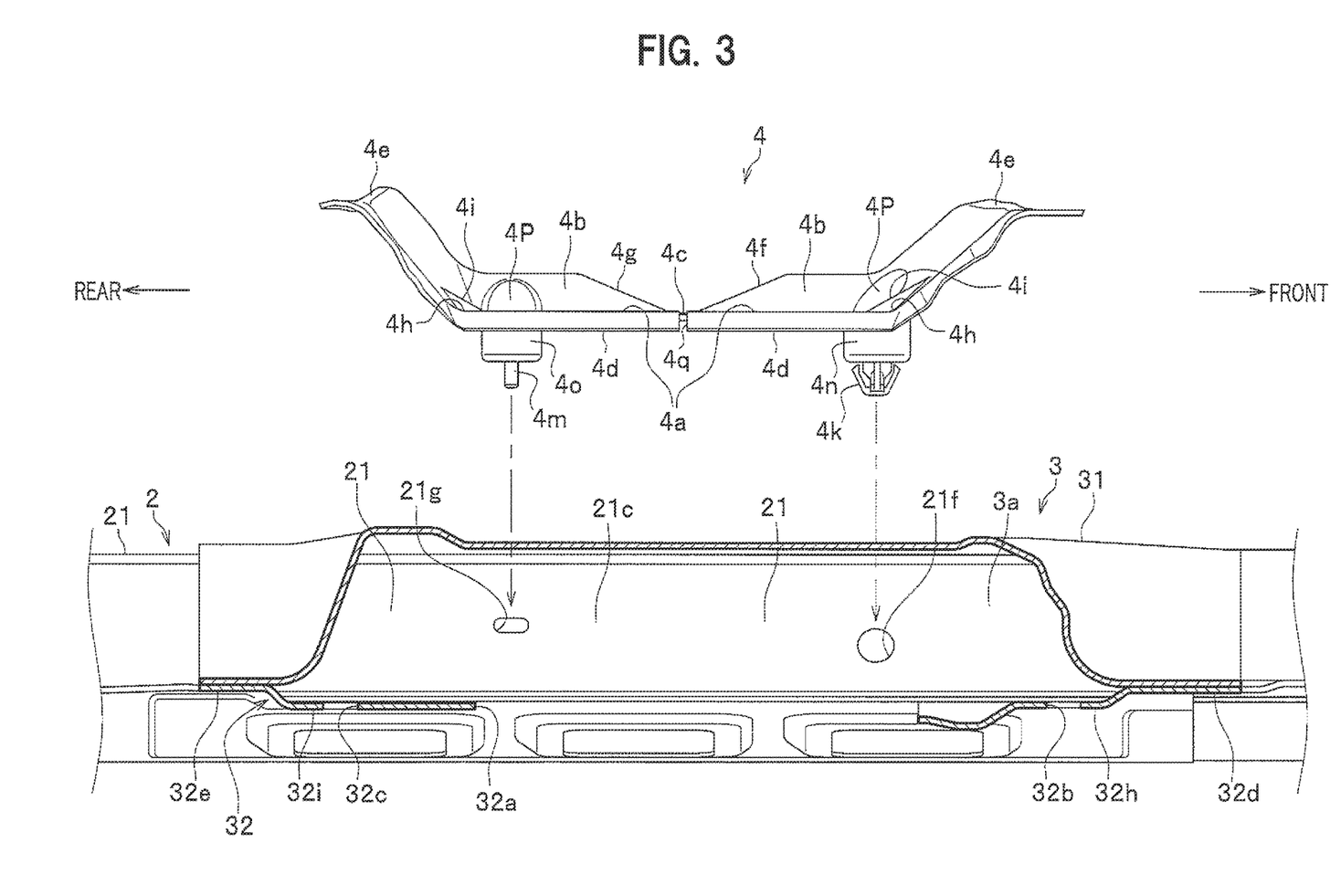
FIG. 3 is an illustration for explaining a partition member that is disposed in a side sill.

FIG. 3 is an illustration for explaining the partition member that is mounted on the upper face of the side sill, and the figure on the upper side is a side view of the partition member and the figure on the lower side is a cross sectional view taken along line III-III in FIG. 1.

As shown in FIG. 3, the upper face part 21c of the side sill outer 21 (side sill 2) is formed with two mounting holes 21f, 21g for mounting of the partition member 4. At least one of the two mounting holes 21f, 21g is composed of a long hole extending in the front-rear direction. For example, the mounting hole 21f on the front side is composed of a circular hole with which a locking part 4k for a round hole of the partition member 4 is engaged. The mounting hole 21g on the rear side is composed of a long hole elongated in the front-rear direction, with which a locking part 4m for a long hole of the partition member 4 is engaged.

Figure 6:
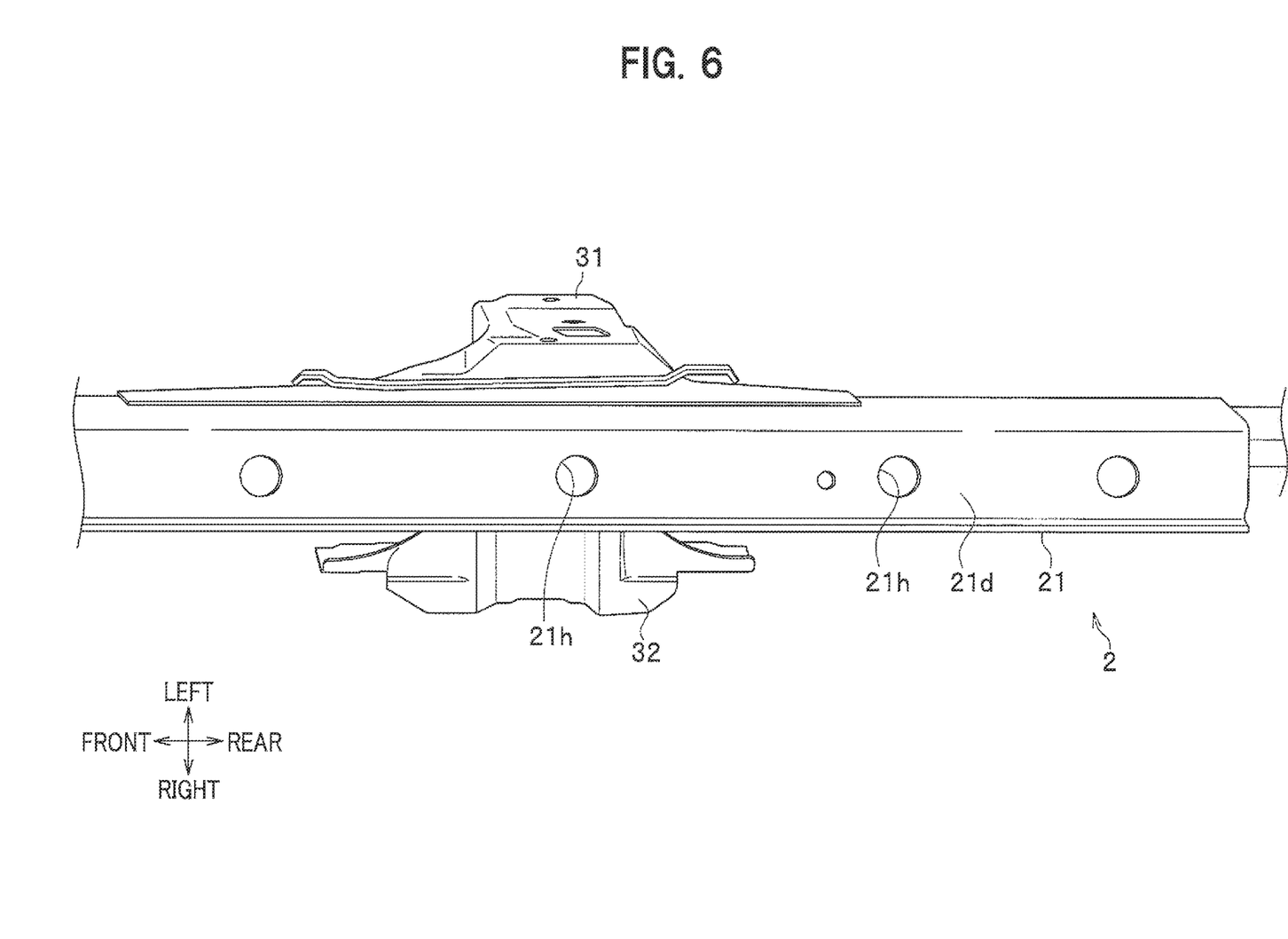
FIG. 6 is an enlarged bottom view of a main part of the side sill.

As shown in FIG. 6, the lower face part 21d of the side sill outer 21 is formed with a plurality of through holes 21h at proper spaces in the front-rear direction. The through holes 21h are holes for improving deposition of electro-deposition coating solution (deposition property) when conducting electro-deposition coating on the inner surface of the side sill 2, and for inserting the tip of a nozzle for rust-preventive agent coating when coating the inside of the closed cross section with rust-preventive agent.

As shown in FIG. 2, the side sill inner 22 formed in nearly linear symmetry with the side sill outer 21 when viewed in longitudinal section, is joined via the center pillar inner 32 to the inner side in the vehicle width direction of the side sill outer 21. As for the shape of the side sill inner 22, description thereof is omitted.

As shown in FIG. 2, the reinforcing members 23, 24 are members for enhancing strengths and bending rigidities of upper and lower corners in the side sill outer 21 having the form of a nearly U-shape (nearly channel-shape) when viewed in longitudinal section. The reinforcing members 23, 24 are formed into a nearly L-shape in front view, so as to be fitted to respective shapes of the upper and lower corners to be joined in the side sill outer 21. The reinforcing members 23, 24 are composed of a high-tensile steel plate or the like formed into an uneven shape when viewed in longitudinal section, in order to enhance strengths thereof.

The guide member 25 is a plate member made of metal having guide holes 25a with which pedestal parts 4n, 4o are engaged when mounting the partition member 4 on the upper face part 21c of the side sill outer 21. The guide member 25 is joined to the upper face part 21c of the side sill outer 21. The guide member 25 is also adapted to hold filler to be described below, and may be composed of a plate member made of resin.

<<Center Pillar>>

As shown in FIG. 2, the center pillar 3 is a column-shaped hollow member that composes a part of the vehicle body side part 1a. The center pillar 3 is composed of a tubular body having a hollow section 3a that forms a closed cross section by joining the upper face part 21c of the side sill outer 21 (the upper face of the side sill 2), the center pillar outer 31, and the center pillar inner 32 to each other. The center pillar 3 is constructed to extend in the up-down direction between a roof side rail (not shown) and the side sill 2. The center pillar 3 has an opening 32a formed on a face on the vehicle interior side thereof (center pillar inner 32), the opening 32a being used for arrangement of the seatbelt retractor 52 in the center pillar 3. Note that an upper half part on the vehicle interior side of the center pillar 3 is covered by a pillar garnish (not shown) which is an interior material. Moreover, the opening 32a formed in a lower half part on the vehicle interior side of the center pillar 3, and the seatbelt 51 are covered by a side lining (not shown).

<Center Pillar Outer>

As shown in FIG. 2, the center pillar outer 31 is a member that forms a face on the vehicle outside of the center pillar 3. The center pillar outer 31 and the center pillar inner 32 are formed, for example, by pressing a flat plate member made of metal such as high-tensile steel. The center pillar outer 31 is formed into a hat shape when viewed in transverse section (see FIG. 3). The center pillar outer 31 is provided to extend upward from the center on the outer face of the side sill outer 21. The center pillar outer 31 is formed into a shape widening in the front-rear direction as it extends downward in side view (see FIG. 1).

<Center Pillar Inner>

As shown in FIG. 2, the center pillar inner 32 is a pillar half body that forms a face on the vehicle interior side of the center pillar 3. The center pillar inner 32 is provided to extend upward from the inner part in the vehicle width direction of the side sill 2. As shown in FIG. 1, the center pillar inner 32 is formed with the opening 32a, filling openings 32b, 32c, flange parts 32d, 32e, bead parts 32f, 32g, protruded parts 32h, 32i, and a recessed part 32j.

Figure 5:
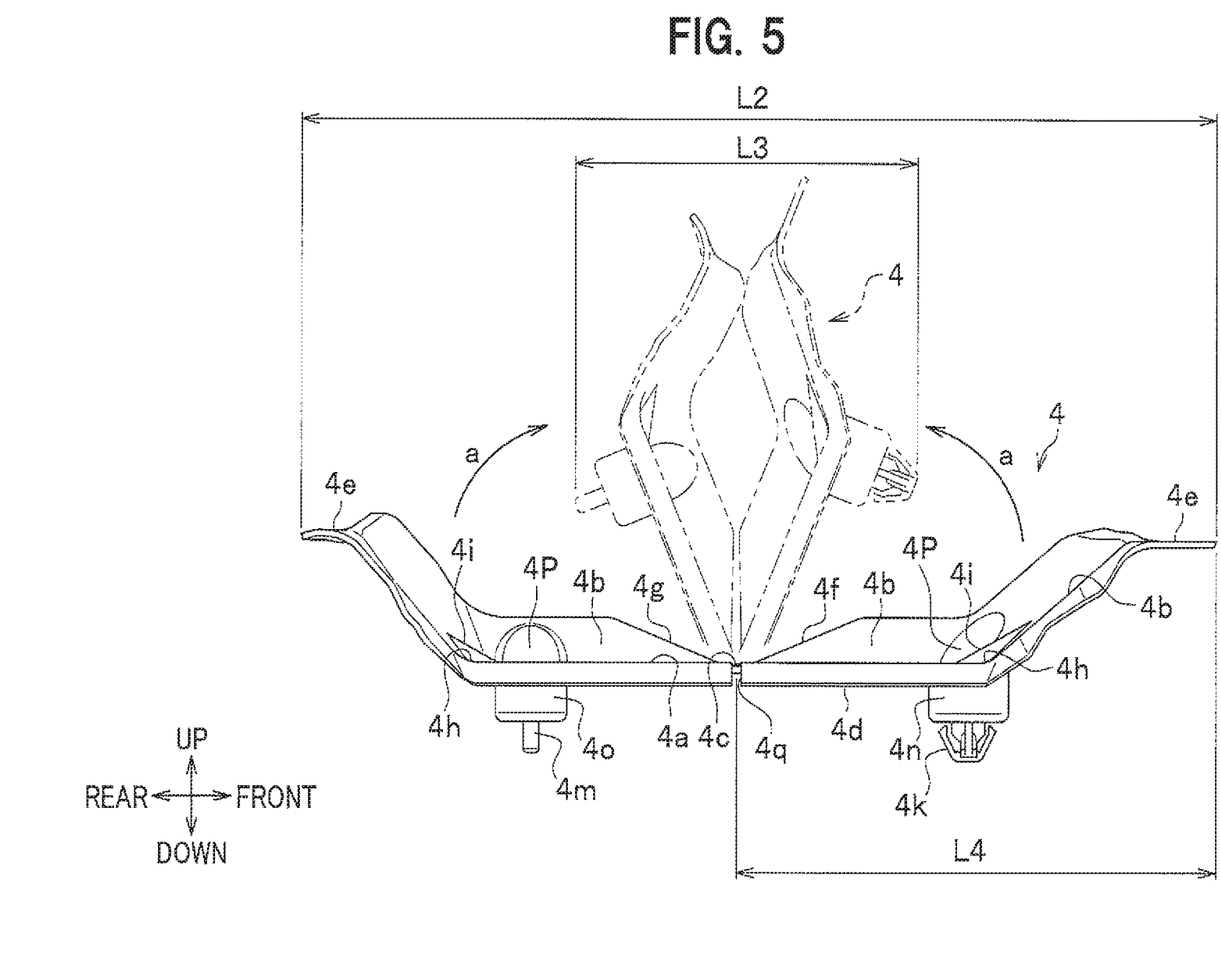
FIG. 5 is an enlarged side view of the partition member.

The opening 32a is an opening for arrangement of the seatbelt retractor 52 (see FIG. 2). The opening 32a is composed of a nearly rectangular opening that is formed in the lower part of the center pillar inner 32 which is the inner part in the vehicle width direction of the center pillar 3. The opening 32a is formed to allow a width L1 thereof to be, for example, shorter than a length L2 in the front-rear direction of the partition member 4 at normal time (at the time of spreading) shown in FIG. 5, and longer than a length L3 in the front-rear direction of the partition member 4 at the time of folding. The opening 32a thus formed allows the partition member 4 folded upward as shown in FIG. 5 to be inserted through the opening 32a.

Note that the opening 32a may be formed to allow the longest width Lmax thereof (see FIG. 1) to be, for example, longer than a length L4 in the up-down direction of the partition member 4 folded (the length is half of the length L2 in the front-rear direction of the partition member 4 at the time of spreading). The opening 32a thus formed makes it possible to insert the partition member 4 folded through the opening 32a, with the partition member 4 tilted along the longest width Lmax.

As shown in FIG. 1, the filling openings 32b, 32c are supply openings through which filler is filled into the hollow section 3a (see FIG. 2) of the center pillar 3. The filling openings 32b, 32c are formed at the front side (front part) and the rear side (rear part) of the opening 32a, respectively. The filling openings 32b, 32c are formed in the protruded parts 32h, 32i of the center pillar inner 32, the protruded parts 32h, 32i protruding inward in the vehicle width direction. Note that the filling openings 32b, 32c only need to be formed to allow the shapes thereof to be fitted to the shape of a filling nozzle (not shown), and are not particularly limited to a round opening.

As shown in FIG. 1, the flange parts 32d, 32e are formed to linearly edge ends in the front-rear direction of the center pillar inner 32 extending in the up-down direction.

The bead parts 32f, 32g are bulged parts for reinforcement provided to extend in the up-down direction along the flange parts 32d, 32e. The bead part 32f is provided adjacent to the rear side of the flange part 32d on the front side. The bead part 32g is provided adjacent to the front side of the flange part 32e on the rear side.

The protruded parts 32h, 32i are bulged parts formed in the lower end parts of the bead parts 32f, 32g. The protruded parts 32h, 32i are formed into a stepped shape with raised by one step from the flange parts 32d, 32e located at both ends in the front-rear direction of the lower end part of the center pillar inner 32 (see FIG. 3).

The recessed part 32j is a recess formed along the bead parts 32f, 32g between the bead part 32f on the front side and the bead part 32g on the rear side. The recessed part 32j has the opening 32a formed in the lower end part thereof.

<Partition Member>

As shown in FIG. 2, the partition member 4 is a member made of resin that is disposed so as to vertically partition the lower part between the center pillar outer 31 and the center pillar inner 32. The partition member 4 is disposed so as to allow a filling space 3b to be formed on the upper face part 21c of the side sill outer 21 (on the upper face of the side sill 2) in the hollow section 3a of the center pillar 3.

Figure 4:
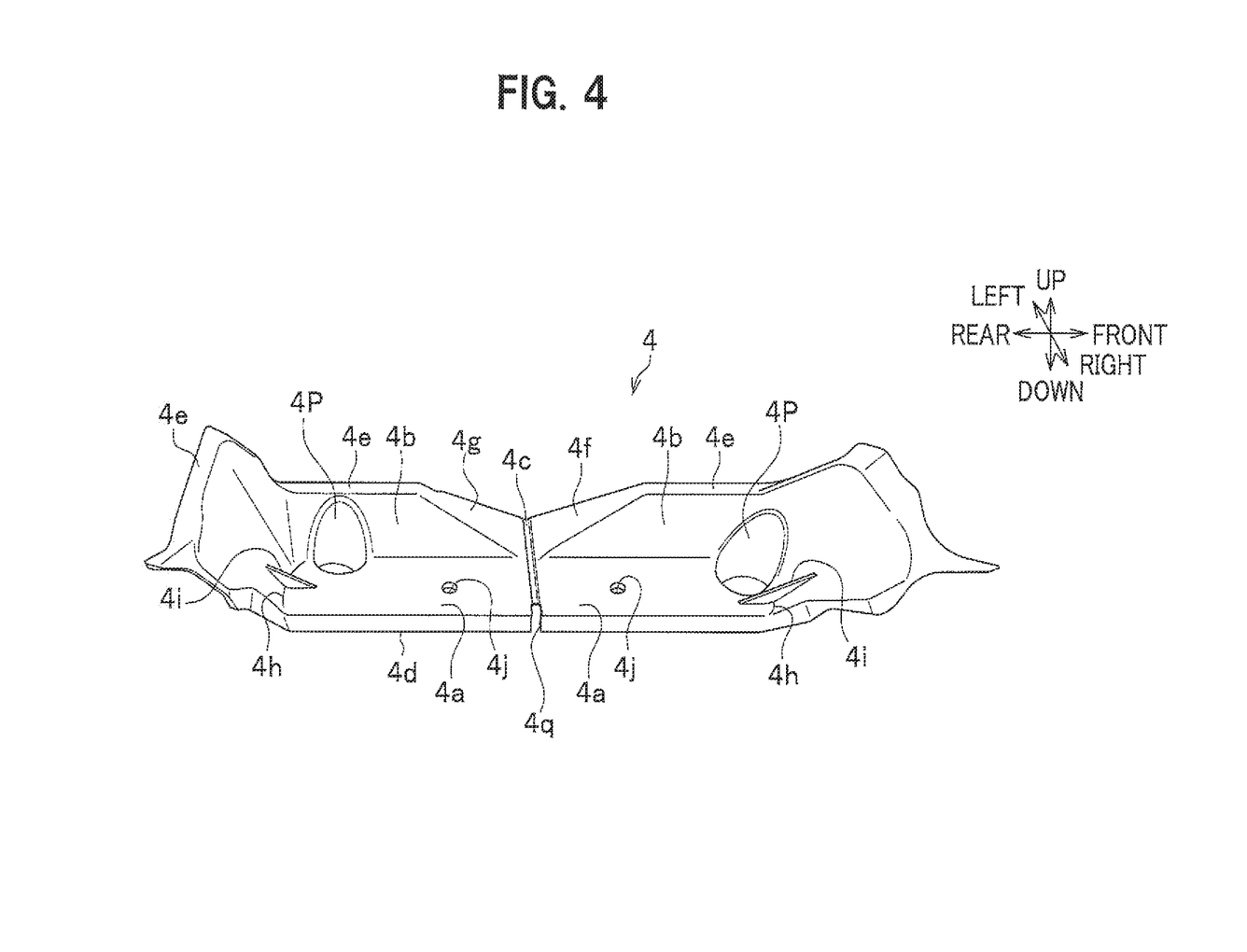
FIG. 4 is an enlarged perspective view of the partition member.

As shown in FIG. 4 and FIG. 5, the partition member 4 includes a partition body 4a, a vertical wall part 4b, a folding part 4c, a bending part 4d, flange parts 4e, inclined parts 4f, 4g, end parts 4h, ribs 4i, vent holes 4j, the locking part 4k for a round hole, the locking part 4m for a long hole, pedestal parts 4n, 4o, cylindrical holes 4p, and a cut-out section 4q.

The partition body 4a is a flat plate-shaped member that is provided to extend in the front-rear direction along the upper face (the upper face part 21c) of the side sill 2. The vertical wall part 4b is formed at the front side, the rear side, and the outer side in the vehicle width direction, of the partition body 4a. The bending part 4d formed to be bent downward at a right angle is formed at the inner side in the vehicle width direction of the partition body 4a. The partition body 4a, the vertical wall part 4b, and the bending part 4d are sectioned into two parts in the front-rear direction, by the folding part 4c having the form of a recessed groove and provided to extend in the right-left direction at the center of the partition member 4, and the cut-out section 4q formed at the inner side in the vehicle width direction of the folding part 4c. The ribs 4i each connecting the vertical wall part 4b with the partition body 4a are formed at the end parts 4h on the front side and the rear side of the partition body 4a. The partition body 4a is arranged at a lower position than a lower opening edge of the opening 32a when disposing the partition member 4 in the hollow section 3a. Consequently, the partition body 4a performs a function of preventing filler filled in the filling space 3b from leaking out through the opening 32a.

The vertical wall part 4b is a part for reinforcing the partition body 4a. The vertical wall part 4b is formed to expand obliquely upward from the front side, the rear side, and the outer side in the vehicle width direction, of the partition body 4a. The upper end part of the vertical wall part 4b is formed with the flange parts 4e and the inclined parts 4f, 4g which are formed to be bent in the outer peripheral direction.

The folding part 4c is a resin hinge that is adapted to be bent to fold the partition member 4 shown in FIG. 2 when the partition member 4 is inserted through the opening 32a into the hollow section 3a to be arranged in the hollow section 3a. As shown in FIG. 5, the folding part 4c is a part formed into a foldable and deformable shape by which the partition body 4a is bent in the up direction (direction indicated by arrow a) with the folding part 4c as the center, to allow the inclined parts 4f, 4g to abut on each other. The folding part 4c is thinly formed by the recessed groove provided to extend in the right-left direction, thereby being easy to be bent and deformed. The bending part 4d on the right end side of the folding part 4c is formed with the cut-out section 4q in order to make the folding part 4c easy to be bent.

The bending part 4d is a part for reinforcing the right end part of the partition body 4a. The bending part 4d extends downward from the right end of the partition body 4a. The bending part 4d is sectioned into two parts by the cut-out section 4q formed at the center of the partition member 4.

The flange parts 4e are parts for reinforcing the vertical wall part 4b, which are formed to be bent in the outer peripheral direction from the outer peripheral part of the vertical wall part 4b.

The inclined parts 4f, 4g are parts for not allowing the two sectioned parts of the vertical wall part 4b to abut on each other when folding the partition member 4 in the up direction with the folding part 4c as the center. The inclined parts 4f, 4g are formed with a nearly V-shaped notch in side view, at the central part of the vertical wall part 4b. In other words, the inclined parts 4f, 4g are formed to be inclined from the flange parts 4e of the upper end of the vertical wall part 4b toward the folding part 4c. This makes it possible for the partition member 4 to be greatly bent as shown in FIG. 5.

As shown in FIG. 4 and FIG. 5, the ribs 4i are reinforcing members each having a triangular shape in side view and formed over the end parts 4h in the front-rear direction of the partition body 4a and the lower end part of the vertical wall part 4b.

The vent holes 4j (see FIG. 4) are holes through which air is released to the outside of the filling space 3b formed below the partition member 4 in the hollow section 3a shown in FIG. 2 when filling filler (not shown), thereby enhancing a filling efficiency of the filler to be filled in the filling space 3b. As shown in FIG. 4, the vent holes 4j are formed in the front central part and the rear central part of the partition member 4, respectively.

As shown in FIG. 3, the locking parts 4k, 4m are locking projections that are engaged with the mounting holes 21f, 21g, thereby allowing the partition member 4 to be mounted, with one touch by snap fitting, on the upper face part 21c of the side sill outer 21. The locking parts 4k, 4m are provided via the pedestal parts 4n, 4o formed on the lower face of the partition member 4, so as to project downward from the lower faces of the pedestal parts 4n, 4o. Note that the locking parts 4k, 4m only need to be engaged with the mounting holes 21f, 21g by snap fitting, and the shapes and locations thereof are not particularly limited.

The pedestal parts 4*n*, 4*o* are composed of projections each having a bottomed cylindrical truncated cone shape and formed on the front central part and the rear central part of the partition member 4, respectively. Cylindrical holes 4P are formed ranging from upper parts of the pedestal parts 4*n*, 4*o* to the insides of the pedestal parts 4*n*, 4*o*, respectively. The pedestal parts 4*n*, 4*o* and the cylindrical holes 4P are formed across boundaries between both end parts in the front-rear direction on the left side of the partition body 4*a* (see FIG. 4) and both end parts in the front-rear direction on the left side of the vertical wall part 4*b*. The cylindrical hole 4P formed ranging from the partition body 4*a* (see FIG. 4) to the vertical wall part 4*b* has a ridgeline formed at an opening edge thereof. Consequently, as for the parts in the front-rear direction of the partition member 4 sectioned into two, rigidity thereof is enhanced by the pedestal parts 4*n*, 4*o* and the cylindrical holes 4P, and the ribs 4*i* described above. Moreover, as shown in FIG. 2 and FIG. 3, the pedestal parts 4*n*, 4*o* are arranged in a state abutting on the upper face part 21*c* of the side sill outer 21, thereby performing a function of maintaining the filling space 3*b* between the upper face part 21*c* of the side sill outer 21 and the lower face of the partition member 4.

<<Seatbelt Device>>

As shown in FIG. 2, the seatbelt device 5 is a device that restrains, for example, the upper half of the body of an occupant seated on the seat (not shown), by means of the seatbelt 51. The seatbelt device 5 is provided with the seatbelt 51 and the seatbelt retractor 52 for retracting one end side of the seatbelt 51.

<Seatbelt Retractor>

The seatbelt retractor 52 is disposed with a part of the seatbelt retractor 52 inserted through the opening 32*a* into the hollow section 3*a* in the center pillar 3. The seatbelt retractor 52 is mounted on the edge of the opening 32*a* with the seatbelt retractor 52 housed in a box-shaped casing (not shown) and by fastening the casing to the edge of the opening 32*a* by means of a mounting bracket (not shown). The seatbelt retractor 52 mounted on the edge of the opening 32*a* is covered by the side lining (not shown) provided on the vehicle interior side of the center pillar 3.

Herein, the seatbelt member described in the claims is one constituent member of the seatbelt device 5 arranged in the hollow section 3*a*. The seatbelt member is mainly composed of, e.g., the seatbelt retractor 52. Moreover, the seatbelt member may include a pretensioner device that automatically retracts the seatbelt 51 to start restraint of the occupant early when detecting collision, an energy absorbing device that reduces load exerted on the seatbelt 51 at the time of collision, and the like.

<<Filler>>

The filler (not shown) is composed of a foaming material for structure. The filler is composed of, for example, what is called spray rubber that is a material in rubber form into which a material in liquid form dries out at room temperature (moreover, also called "spray foam" or "liquid rubber"). The filler is, as one example thereof, polyurethane foam having quick curability which is housed in a spray can and, when jetted out of the can, jets in foam form to be cured in the state of a sponge. The filler solidified serves as a soundproof material, a vibrational energy absorbing material, and an impact energy absorbing material. The filler is filled in the filling space 3*b* to be solidified and brings into a closed state the lower part in the hollow section 3*a* defined by the center pillar outer 31, the center pillar inner 32, and the upper face part 21*c* of the side sill outer 21.

<<Action and Effects of the Vehicle Body Side Part Structure>>

Next, action and effects of the vehicle body side part structure A according to the embodiment of the present invention will be described according to the procedure of assembly with reference to FIGS. 1 to 6.

When the partition member 4 is disposed in the hollow section 3*a* between the center pillar outer 31 and the center pillar inner 32 shown in FIG. 2, the partition member 4 is first bent to be folded in half into a small shape as indicated by a two-dot chain line in FIG. 5. Next, the partition member 4 that is folded is inserted through the opening 32*a* shown in FIG. 2 into the hollow section 3*a*. The partition member 4 is folded thereby allowing the length L3 in the front-rear direction thereof to be shorter than the width L1 of the opening 32*a*. Consequently, the partition member 4 can be easily inserted through the opening 32*a* into the hollow section 3*a* to be arranged.

Next, the partition member 4 is spread into the state at normal time as shown in FIG. 3, and the locking part 4*k* is first pressed into the mounting hole 21*f* composed of a round hole to be engaged with the mounting hole 21*f*. Subsequently, the partition member 4 is allowed to move rotationally around the mounting hole 21*f* as the center, to the mounting hole 21*g* composed of a long hole, and the locking part 4*m* is pressed into the mounting hole 21*g* to be engaged with the mounting hole 21*g*. At that time, even if the partition member 4 is allowed to move rotationally, the tip of the locking part 4*m* does not abut on the edge in the longitudinal direction of the mounting hole 21*g* because the mounting hole 21*g* is composed of a long hole elongated in the front-rear direction, thus making it possible to allow the locking part 4*m* to be smoothly engaged with the mounting hole 21*g*.

Moreover, as shown in FIG. 2, the guide holes 25*a* of the guide member 25 are arranged around the mounting holes 21*f*, 21*g*. This makes it possible to allow the locking parts 4*k*, 4*m* to be easily fitted into the mounting holes 21*f*, 21*g*.

Next, filler in liquid form (not shown) is injected through the filling openings 32*b*, 32*c* shown in FIG. 1 to pour the filler into the filling space 3*b* shown in FIG. 2. The filler dries out to be solidified, thereby bringing into a closed state the space between the partition member 4 at the lower part in the hollow section 3*a* and the upper face part 21*c* of the side sill outer 21. Consequently, even if, when the vehicle is traveling, a travel wind hits on the through holes 21*h* of the lower face part 21*d* of the side sill outer 21 to generate a wind noise, and a road noise is generated due to contact of the tires with the road surface, the filler blocks and absorbs the travel wind and the road noise. As a result, the filler can prevent the travel wind and the road noise from being transmitted via the center pillar 3 to the inside of the cabin.

Moreover, the side sill outer 21 is interposed between the center pillar outer 31 and the center pillar inner 32, and disposed with the filler and the partition member 4 being constructed on the upper face part 21*c* thereof. Consequently, the space between the center pillar outer 31 and the center pillar inner 32 is kept to be a fixed space at all times by the side sill outer 21, the filler and the partition member 4, thus making it possible to enhance the strength of the whole structure. As a result, the center pillar inner 32 can make up for locally insufficient strength which is caused due to formation of the opening 32*a*.

In this case, the vehicle body side part structure A includes the side sill 2 extending in the front-rear direction of the vehicle body, the center pillar outer 31 provided to extend upward from the side sill 2, the center pillar inner 32 disposed on the inner side in the vehicle width direction of the center pillar outer 31, and the partition member 4 disposed in the hollow section 3a formed by the center pillar outer 31 and the center pillar inner 32. The center pillar inner 32 has the opening 32a for arrangement of the seatbelt member in the hollow section 3a, and the partition member 4 has the folding part 4c formed into a foldable shape that allows the partition member 4 to pass through the opening 32a.

With this configuration, the partition member 4 can be easily arranged through the opening 32a for mounting of the seatbelt member in the hollow section 3a of the center pillar 3 because it has a foldable form. Moreover, the partition member 4 can be composed of one member without being separated into a plurality of members because it has the folding part 4c, thus making it possible to reduce the number of components and the number of man-hours of assembly and to simplify the structure to facilitate the assembly. Therefore, the present invention makes it possible to provide a vehicle body side part structure that has a simple structure and is easy to be assembled.

Moreover, the side sill 2 has on the upper face thereof a plurality of mounting holes 21f, 21g for mounting of the partition member 4, and at least one of the plurality of mounting holes 21f, 21g is composed of a long hole extending in the front-rear direction.

With this configuration, when the partition member 4 is fixed with its spreading state to the side sill 2, the tip of the locking part 4m does not abut on the edge in the longitudinal direction of the mounting hole 21g even if, after allowing the locking part 4k to be engaged with the mounting hole 21f, the partition member 4 is allowed to move rotationally to allow the locking part 4m to be engaged with the mounting hole 21g. Consequently, the side sill 2 makes it possible to allow the locking parts 4k, 4m to be easily engaged with the mounting holes 21f, 21g because it has the long hole. As a result, assembling workability of the partition member 4 can be improved to facilitate the assembly with the side sill 2.

Moreover, the partition member 4 includes the partition body 4a disposed along the upper face (upper face part 21c) of the side sill 2, the vertical wall part 4b extending in the up-down direction from the end parts 4h in the front-rear direction of the partition body 4a, and the ribs 4i connecting the vertical wall part 4b with the partition body 4a.

With this configuration, the partition member 4 makes it possible to prevent the vertical wall part 4b from falling down when filling filler such as a foaming material from below the partition member 4 because the ribs 4i are provided for reinforcement at the corners between the partition body 4a and the vertical wall part 4b.

Moreover, the partition member 4 has the vent hole 4j formed in at least one of the front central part and the rear central part thereof.

With this configuration, the partition member 4 makes it possible to release air in the filling space 3b through the vent holes 4j to the outside of the filling space 3b when filling the filler in the lower side of the partition member 4 because the vent holes 4j are provided in the front central part and the rear central part.

Moreover, the center pillar inner 32 has in the front part and the rear part thereof the filling openings 32b, 32c through which the filler is filled into the hollow section 3a, and the filling openings 32b, 32c are formed in the protruded parts 32h, 32i of the center pillar inner 32, the protruded parts 32h, 32i protruding inward in the vehicle width direction.

With this configuration, the filling openings 32b, 32c make it possible to suppress a decrease in the strength of the center pillar inner 32 which is caused due to provision of the filling openings 32b, 32c because they are formed in the protruded parts 32h, 32i protruding from the center pillar inner 32.

<Modifications>

Note that the present invention is not limited to the above embodiment and various alterations and modifications are possible within the scope of the technical ideas, and thus it is of course that the present invention is also extended to altered and modified inventions.

For example, the filler may be composed of a foamed synthetic resin or a foamed thermosetting resin that is formed into foam or a porous shape by application of heat. Moreover, the filler may be composed of, e.g., a polyurethane resin having good adhesiveness to a metal, or an adhesive having elasticity like a rubber such as silicone.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

1: Vehicle body; 2: Side sill; 3: Center pillar; 3a: Hollow section; 4: Partition member; 4a: Partition body; 4b: Vertical wall part; 4c: Folding part; 4h: End part in front-rear direction; 4i: Rib; 4j: Vent hole; 5: Seatbelt device; 21: Side sill outer; 21c: Upper face part (Upper face); 21f: Mounting hole; 21g: Mounting hole (Long hole); 31: Center pillar outer; 32: Center pillar inner; 32a: Opening; 32b, 32c: Filling opening; 32h, 32i: Protruded part; 52: Seatbelt retractor (Seatbelt member); A: Vehicle body side part structure

What is claimed is:

1. A vehicle body side part structure comprising:
   a side sill extending in a front-rear direction of a vehicle body;
   a center pillar outer provided to extend upward from the side sill;
   a center pillar inner disposed on an inner side in a vehicle width direction of the center pillar outer; and
   a partition member disposed in a hollow section formed by the center pillar outer and the center pillar inner, wherein
   the center pillar inner has an opening for arrangement of a seatbelt member in the hollow section,
   the partition member has a folding part formed into a foldable shape that allows the partition member to pass through the opening,
   the side sill has on an upper face thereof a plurality of mounting holes for mounting of the partition member, and
   at least one of the plurality of mounting holes is composed of a long hole extending in the front-rear direction.

2. The vehicle body side part structure according to claim 1, wherein the partition member includes:
   a partition body disposed along an upper face of the side sill;
   a vertical wall part extending in an up-down direction from an end part in the front-rear direction of the partition body; and
   a rib connecting the vertical wall part with the partition body.

3. The vehicle body side part structure according to claim 2, wherein
the partition member has a vent hole formed in at least one of a front central part and a rear central part thereof.

4. The vehicle body side part structure according to claim 3, wherein
the center pillar inner has in a front part and a rear part thereof a filling opening through which filler is filled into the hollow section, and
the filling opening is formed in a protruded part of the center pillar inner, the protruded part protruding inward in the vehicle width direction.

5. The vehicle body side part structure according to claim 2, wherein
the center pillar inner has in a front part and a rear part thereof a filling opening through which filler is filled into the hollow section, and
the filling opening is formed in a protruded part of the center pillar inner, the protruded part protruding inward in the vehicle width direction.

6. The vehicle body side part structure according to claim 1, wherein
the partition member has a vent hole formed in at least one of a front central part and a rear central part thereof.

7. The vehicle body side part structure according to claim 6, wherein
the center pillar inner has in a front part and a rear part thereof a filling opening through which filler is filled into the hollow section, and
the filling opening is formed in a protruded part of the center pillar inner, the protruded part protruding inward in the vehicle width direction.

8. The vehicle body side part structure according to claim 1, wherein
the center pillar inner has in a front part and a rear part thereof a filling opening through which filler is filled into the hollow section, and
the filling opening is formed in a protruded part of the center pillar inner, the protruded part protruding inward in the vehicle width direction.

* * * * *